United States Patent Office 3,530,649
Patented Sept. 29, 1970

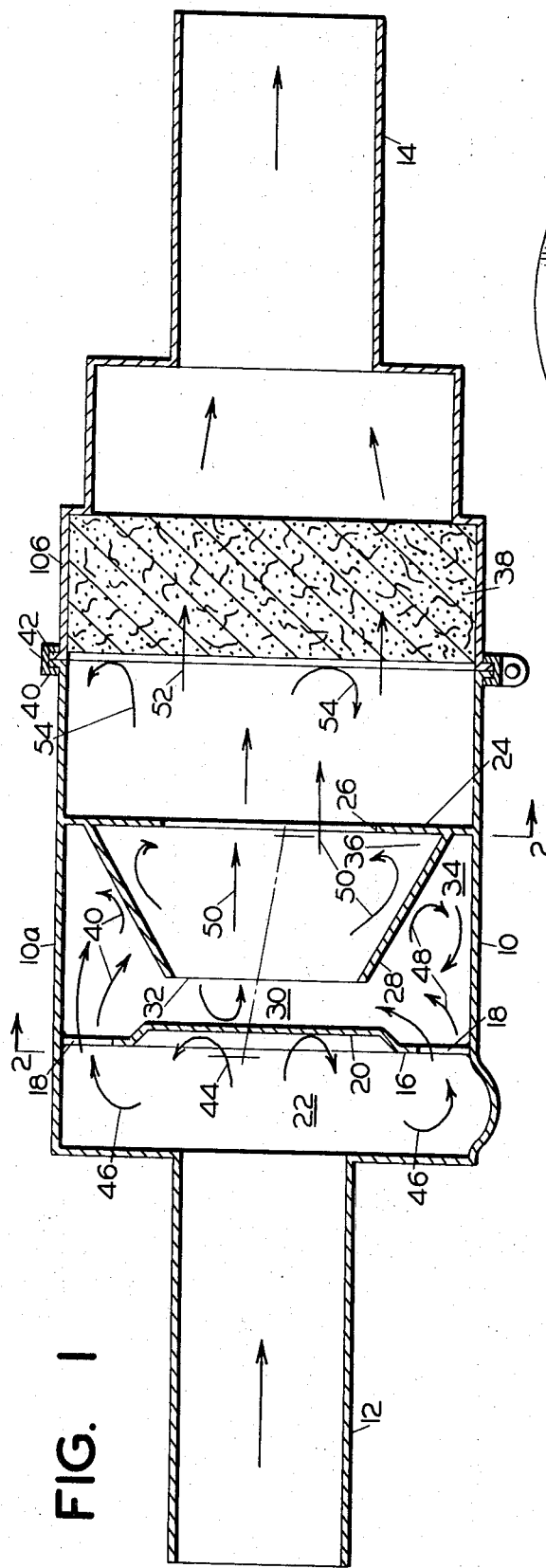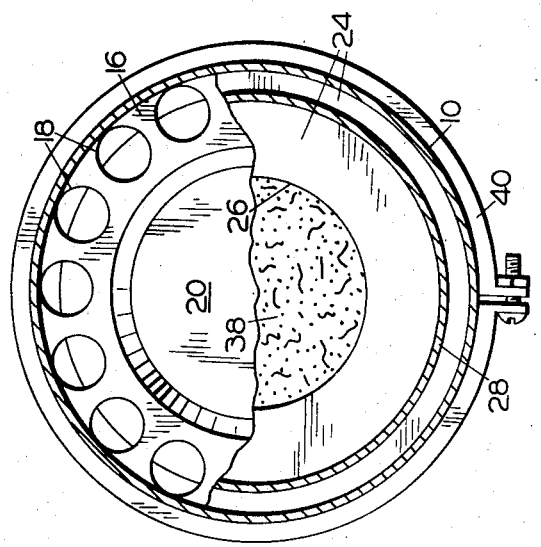

3,530,649
AIR POLLUTION CONTROL DEVICE
FOR ENGINES
Fred W. Porsch, P.O. Box 245, Roy, Wash. 98580;
Chester M. Shelton, 15018 E. Bingham, Tacoma,
Wash. 98446; and Lawrence O. Dove, Rte. 1, Box
160, Roy, Wash. 98580
Filed June 28, 1968, Ser. No. 741,111
Int. Cl. B01d 50/00
U.S. Cl. 55—316                                3 Claims

ABSTRACT OF THE DISCLOSURE

The air pollution control device hereof includes a tubular casing having an inlet end for attachment to the exhaust outlet of an engine. Within the casing adjacent the inlet end is a first transverse baffle or wall having a plurality of apertures adjacent its outer edge through which the waste products of combustion such as exhaust gases, soot, etc. pass. This first baffle has a central indentation to cause an agitation of the said waste products. A second transverse baffle or wall is disposed between the first baffle and a filter, and a forwardly extending cone-shaped wall is secured to the second baffle. This cone-shaped wall is arranged to produce further agitation in the waste products of combustion. The second baffle is provided with an enlarged central opening through which the waste products of combustion pass on their way to the filter. The filter is of a type to remove the solid particles from the gases and also to remove obnoxious gases if desired.

---

This invention relates to new and useful improvements in air pollution control devices for engines.

A primary objective of the present invention is to provide an improvement over those types of devices intended to remove undesirable waste products of combustion from vehicle engines, and in general to provide a device comprising a novel arrangement of transverse baffles designed to cause a turbulence of the exhaust gases within a tubular casing to ignite unburned gases and to distribute movement of the gases uniformly through the surface of a filter.

A more particular object is to provide an air pollution control device having an inlet end and an outlet end and including a first baffle designed to agitate the exhaust gases and cause unburned gases to be ignited, and a second baffle supporting a cone-shaped baffle thereon directed toward the first baffle, such second baffle and cone-shaped baffle being arranged to create further turbulence or agitation of the exhaust gases for distributing the movement thereof uniformly through a filter.

The invention will be better understood and additional objects and advantages will become apparent from the following description taken in connection with the accompanying drawings which illustrate a prefered form of the device.

In the drawings:

FIG. 1 is a longitudinal sectional view through the air pollution control device of the present invention; and FIG. 2 is a transverse sectional view taken on the offset line 2—2 of FIG. 1.

Referring in particular to the drawings the present device comprises a tubular casing or housing 10 having an inlet extension 12 and an outlet extension 14. The device is particularly useful in exhaust systems of internal combustion engines, and when so used the inlet extension 12 is connected to the discharge end of the muffler and the outlet extension 14 is connected to the tail pipe. Although the device is illustrated for use in the exhaust system of internal combustion engines, it is to be understood that it also can be used in the exhaust systems of stationary power plants or the like, such as factories.

Disposed within the casing 10 a short distance rearward of the inlet end is a first transverse baffle or plate 16 having a plurality of apertures 18 adjacent its outer edge. Baffle 16 comprises substantially a flat plate except that it has a central recess or indentation 20 which is arranged to cause an agitation or swirling of exhaust gases which enter forcefully through the inlet 12. The total cross sectional area of apertures 18 is greater than the cross sectional area of inlet pipe 12 whereby the exhaust gases will move freely past the baffle 16. The arrangement of internal structure of the device is such as to cause a thorough agitation of the exhaust gases before passing them through a filter. Thus far described, the exhaust has impinged against baffle 16 and bounced back and swirled around in the area forwardly of said baffle. Such area is designated by the reference numeral 22. Indentation 20 assists in causing the swirling agitation movement of the gases.

The device includes a second baffle or plate 24 disposed rearwardly of the first baffle 16. Baffle 24 has an enlarged central opening 26, and extending forwardly from the baffle 24 is a hollow baffle 28 assuming the shape of a truncated cone. The diameter of the baffle 28 at its base is of less diameter than the casing 10 but is larger than the diameter of aperture 26. The top of baffle 28 terminates short of baffle 16 to form an inlet area 30 through which gases move into the inlet end 32 of baffle 28. By means of the structure described, an annular pocket 34 is formed exteriorly of the cone-shaped baffle 28, namely, between the outer casing 10, the baffle 28, and the outer portion of baffle 24. Similarly, pocket 36 is formed interiorly of the cone-shaped baffle 28, namely, in the rear corner as defined by the interior of baffle 28 and baffle 24. These pockets assist in maintaining the exhaust gases in an agitated state.

The diameter of indentation 20 in the baffle 16 is intentionally larger than the opening 32 of the baffle 28 to cause the exhaust gases to be directed or fanned into the opening 32. Also, the aperture 26, or in other words, the outlet of the cone 28, is larger in diameter than the inlet 32 for a purpose to be described hereinafter in connection with the operation of the device. Furthermore, the area 30 between the baffle 28 and baffle 16 is restricted in size with relation to the peripheral area of the cone whereby exhaust gases must be compressed somewhat as they move into the opening of the baffle 28.

Mounted in the casing 10 rearwardly of the baffle plate 22 is a filter 38 of a suitable type for filtering out solid particles from the waste products of combustion and if desired certain obnoxious gases such as carbon monoxide. Such filter may for example comprise a charcoal and silica filter for accomplishing the desired result, as is well known.

In order to change or clean the filter 38, casing 10 is formed of two parts 10a and 10b connected together adjacent the filter by a clamp 40 of conventional structure. This clamp is removably engageable with ribs 42 on the two housing parts.

In the operation of the present device, waste products of combustion from inlet 12 first enter area 22 and impinge forcefully against the baffle 16 and are reversed in the direction of arrows 44. The said waste products then move radially outwardly and are forced through apertures 18 in the direction of arrows 46. The recess portion 20 of the baffle plate 16 causes an increased agitation or turbulence of the waste products of combustion, and some of the unburned fuel mixture will be ignited during such turbulence. Waste products escaping through apertures 18 move directly into area 30 or into pocket area 34. Those waste products moving in pocket area 34 are reversed to maintain agitation of the flow, and to further maintain agitation and turbulence, the waste products of combustion coming through apertures 18 impinge against the sloping wall of baffle 28. The movement of the said waste products in pockets 34 and area 30 is designated by the arrows 48. The waste products then move through the opening 32 of the cone after first having been compressed by their forced movement into area 30 from the outer peripheral portion around the baffle 28. Some of the said products will move straight through the cone while others will be directed into pockets 36, as designated by the arrows 50, and be deflected out to cause some agitation of the main flow of gases. Also, since the gases are compressed when forced into area 30 they expand freely when going through the cone in a Venturi action and thus further are agitated as they move out through aperture 26 toward the filter 38.

Some of the waste products of combustion will pass directly through the filter 30, as designated by arrows 52, but others will reverse and circulate in the area ahead of the filter, as designated by the arrows 54, before being forced through said filter.

The principle of the present device, using the various baffles, indentation 20 in the baffle 16, and other structure described, is to keep the waste products of combustion in constant agitation or turbulence first to ignite unburned fuel in the area forward of the first baffle 16, second, to prevent any particles from settling out, and third, to uniformly distribute particles on the filter 30. Such arrangement of structure has been found to efficiently eliminate smog particles from the waste products of combustion, and if a proper filter 38 is used obnoxious gases may also be removed.

It is to be understood that the form of our invention herein shown and described is to be taken as a preferred example of the same and that various changes in the shape, size and arrangement of parts may be resorted to without departing from the spirit of our invention.

Having thus described our invention, we claim:

1. An exhaust filter comprising a tubular casing provided with end walls having inlet and outlet flow connections respectively, a first plate extending across said casing positioned adjacent to and spaced from said inlet, said plate being provided with a central recess facing the inlet and a plurality of apertures about and adjacent the outer periphery thereof, a porous filter positioned across said casing adjacent said outlet, a second plate having a central aperture positioned across said casing and spaced from and between said first plate and said filter, a hollow frusto-conical member co-axial with said casing extending from said second plate and tapering inwardly towards said first plate and terminating in an aperture spaced from said first plate corresponding substantially to the size of the aperture in the second plate.

2. The exhaust filter of claim 1 wherein said filter comprises charcoal and silica gel.

3. The exhaust filter of claim 1 wherein said casing comprises first and second portions detachably secured to each other between the second plate and the outlet flow connection.

References Cited

UNITED STATES PATENTS

| 672,531 | 4/1901 | Hunter | 55—316 |
|---|---|---|---|
| 992,839 | 5/1911 | Wolle et al. | 181—57 |
| 1,081,348 | 12/1913 | Unke et al. | 181—68 |
| 2,273,210 | 2/1942 | Lowther et al. | 55—503 |
| 2,732,026 | 1/1956 | Folts | 181—57 |
| 2,738,854 | 3/1956 | Thrower | 55—387 |
| 2,951,551 | 9/1960 | West | 55—316 |
| 3,065,774 | 11/1962 | Grimes | 60—29 |
| 3,224,171 | 12/1965 | Bowman | 55—478 |
| 3,376,695 | 4/1968 | Muckley | 55—387 |

FRANK W. LUTTER, Primary Examiner

B. NOZICK, Assistant Examiner

U.S. Cl. X.R.

55—325, 387, 444, 446, 465; 60—29; 181—57, 68